United States Patent
Lee et al.

(10) Patent No.: US 8,469,371 B1
(45) Date of Patent: Jun. 25, 2013

(54) ACTIVE GEOMETRY CONTROL SUSPENSION SYSTEM

(75) Inventors: Un Koo Lee, Seoul (KR); Sung Bae Jang, Suwon-si (KR); Byung Gu Kang, Seoul (KR); Sang Hoon Yoo, Asan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/588,315

(22) Filed: Aug. 17, 2012

(30) Foreign Application Priority Data

Dec. 12, 2011 (KR) .................... 10-2011-0132821

(51) Int. Cl.
*B60G 7/00* (2006.01)

(52) U.S. Cl.
USPC ............... 280/5.52; 280/5.521; 280/86.75; 280/86.751

(58) Field of Classification Search
USPC ......... 280/5.52, 5.521, 86.75, 86.751, 86.753
See application file for complete search history.

(56) References Cited

U.S. PATENT DOCUMENTS

| 5,382,043 | A | * | 1/1995 | Jordan | 280/86.753 |
| 5,398,411 | A | * | 3/1995 | Kusaka et al. | 29/897.2 |
| 6,302,416 | B1 | * | 10/2001 | Schmack | 280/93.512 |
| 6,367,826 | B1 | * | 4/2002 | Klais | 280/86.751 |
| 6,503,039 | B2 | * | 1/2003 | Ward | 411/427 |
| 6,688,616 | B1 | * | 2/2004 | Ziech | 280/86.751 |
| 6,851,687 | B2 | * | 2/2005 | Klais | 280/86.754 |

FOREIGN PATENT DOCUMENTS

| JP | 2010-52583 A | 3/2010 |
| KR | 10-2010-0048158 A | 5/2010 |
| KR | 10-2011-0020121 A | 3/2011 |

* cited by examiner

*Primary Examiner* — Toan To
(74) *Attorney, Agent, or Firm* — Morgan, Lewis & Bockius LLP

(57) ABSTRACT

An active geometric control suspension system may include an upper arm connected to a side above and between a rear wheel-sided knuckle and a subframe, and an assist link connected to the other side above and between the knuckle and the subframe, together with a node-changeable unit, wherein the node-changeable unit includes a housing formed at a portion of the subframe, a track-variable kit detachably coupled to brackets of the housing, cam-operating rails fixed to a side of the track-variable kit, a cam disposed on the cam-operating rails of the track-variable kit to be slidable up/down along the cam-operating rails, and a cam bolt connecting the cam with a vehicle body-sided connecting portion of the assist link.

9 Claims, 6 Drawing Sheets

ACTIVE GEOMETRY CONTROL SUSPENSION SYSTEM

CROSS-REFERENCE TO RELATED APPLICATION

The present application claims priority to Korean Patent Application No. 10-2011-0132821 filed in the Korean Intellectual Property Office on Dec. 12, 2011, the entire contents of which is incorporated herein for all purposes by this reference.

BACKGROUND OF THE INVENTION

1. Field of the Invention

The present invention relates to an active geometry control suspension system (AGCS), and more particularly, to an active geometry control suspension system that makes it possible to reduce machining cost and A/S cost by using a track-variable kit that is separately manufactured.

2. Description of Related Art

An active geometry control suspension system that is generally applied to a rear suspension is a device that improves handling performance by improving cornering force of the rear wheel by changing the geometry of the rear suspension, when a vehicle rapidly turns.

The active geometry control suspension system causes oversteer particularly when a vehicle rapidly turns, thereby reducing the steering stability, and the steering stability of the vehicle is improved by applying toe-in to the rear wheel at the outside, when the vehicle rapidly turns, in order to prevent the oversteer.

FIG. 1 is a perspective view showing an example of a common active geometry control suspension system.

Referring to FIG. 1, an active geometry control suspension system includes a lower arm 7 under and between a knuckle 1 at a rear wheel W and a subframe 5 mounted on a cross-member 3.

An upper arm 9 is connected to a side above and between the knuckle 1 and the subframe 5 and an assist link 11 is connected to the other side above and between the knuckle 1 and the subframe 5, together with a node-changeable unit 20.

One end of the assist link 9 is connected to the upper portion of the knuckle 1 through a ball joint BJ and the other end is connected to the subframe 5 through the node-changeable unit 20, thereby forming a vehicle body-sided node P.

FIGS. 2 and 3 are a side perspective view and an internal configuration view of an assist link and a node-changeable unit that are applied to the active geometry control suspension system.

The node-changeable unit 20, as shown in FIGS. 2 and 3, includes a housing with rail-mounting grooves 21, a cam-operating rail 25, a cam 27, rotary levers 29, a motor 31, and a slider 33.

The housing 23 is integrally formed with the subframe 5 and has the arc-shaped rail-mounting groove 21 at both sides.

The cam-operating rail 25 is fixed in the rail-mounting grooves 21 of the housing 23.

The cam 27 is coupled to be slidable up/down on the outer side of the cam-operating rail 25 and connected with the vehicle body-sided connection portion of the assist link 11 by a bolt 35.

The rotary levers 29 are fitted at both sides of the vehicle body-sided connecting portion of the assist link 11, and one end of the rotary lever 29 is hinged to one side of the housing 23 and forms a hinge point H and the other end has a fork 37 and is connected with the slider 33.

The motor 31 includes a reducer 39 and is disposed with a screw shaft, 41, which is a rotary shaft, facing down.

The slider 33 has the center portion thread-fastened to the screw shaft 41 and moves up/down in the rotational direction of the screw shaft 41.

Further, two guide pins 43 are disposed through the slider 33 in the up-down direction and the pins guide the slider 33 moving up/down while preventing the slider 33 from rotating, when the screw shaft 41 rotates.

In addition, fork protrusions 45 are formed at both sides of the slider 33 and fitted in the forks 37 of the rotary levers 29.

Therefore, the active geometry control suspension system applies toe-in to the rear wheel W with bump at the outside, when a vehicle rapidly turns.

That is, when a vehicle rapidly turns and a controller moves down the slider 33 by driving the motor 31, the rotary levers 29 connected to the sliders 33 rotate about the hinge points H.

Accordingly, the vehicle body-sided connection portion that forms the vehicle body-sided node P of the assist link 11 moves down with the cam 27 along the cam-operating rail 25 and moves down the position of the vehicle body-sided node P of the assist link 11.

Therefore, the toe-in value of the rear wheel W at the outside increases and improves stability of turning of a vehicle under the circumstances such as when the vehicle turns at high speed and receives cross wind, and the vehicle suddenly changes the lane, thereby implementing stable travel performance of the vehicle.

However, since the rail-mounting grooves 21 are formed at the housing 23 in the active geometry control suspension system described above, it is also necessary to change the tracks of the rail-mounting grooves 21 when performance tuning is performed while the tracks of the cam-operating rails 25 are changed in the development, it is required to manufacture a new housing 23 every time the tracks change, thereby causing a large amount of cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active geometry control suspension system having advantages of reducing machining cost and A/S cost by applying a track-variable kit having the function of a cam-operating rail for each track for performance tuning to keep using a housing.

In an aspect of the present invention, an active geometric control suspension system may include an upper arm connected to a side above and between a rear wheel-sided knuckle and a subframe, and an assist link connected to the other side above and between the knuckle and the subframe, together with a node-changeable unit, wherein the node-changeable unit may include a housing formed at a portion of the subframe, a track-variable kit detachably coupled to brackets of the housing, cam-operating rails fixed to a side of the track-variable kit, a cam disposed on the cam-operating rails of the track-variable kit to be slidable up/down along the cam-operating rails, and a cam bolt connecting the cam with a vehicle body-sided connecting portion of the assist link.

The track-variable kit has vertical members standing at both sides, with the vehicle body-sided connecting portion of the assist link therebetween, and having a through-hole at the center thereof, wherein the vertical members are detachably fixed to the brackets of the housing, and a horizontal member connecting the vertical members, Bolt holes are formed at first and second protrusions formed upward from one of the vertical members and toward a vehicle body and the track-variable kit is fastened to the brackets of the housing by bolts.

A receiving opening is formed between the brackets to receive the horizontal member and one of the vertical members therethrough.

The vertical members may include a rail seat recessed at a lateral side thereof and the through-hole is formed in the rail seat.

The rail seat may include a protrusion extending towards the subframe.

A guide hole is formed to the cam-operating rails and the cam slidably covers the guide hole.

The brackets may include a mounting groove formed along an inner circumference of the rail-mounting hole.

Each of the vertical members of the track-variable kit is coupled to the mounting groove.

According to the exemplary embodiment of the present invention, it is possible to keep using the housing and reduce the machining cost by only manufacturing and applying a new track-variable kit, when it is necessary to change the track in tuning for improving toe change performance of a vehicle.

Further, even if the system is actually applied to a vehicle, it is possible to replace only the track-variable kit when the parts are replaced in A/S, such that it is possible to reduce the cost for repair.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
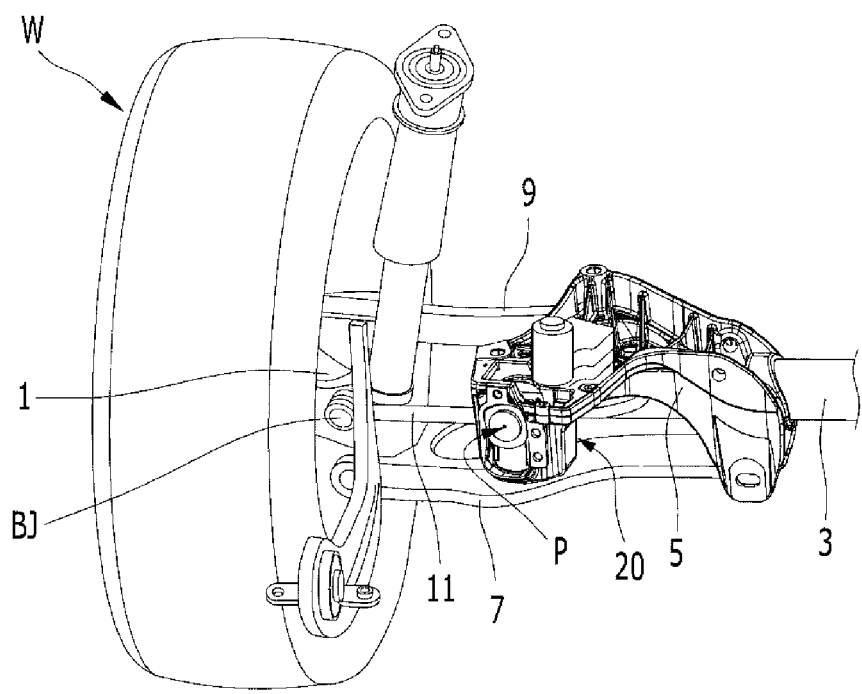
FIG. 1 is a perspective view of a common active geometry control suspension system.
Figure 2:
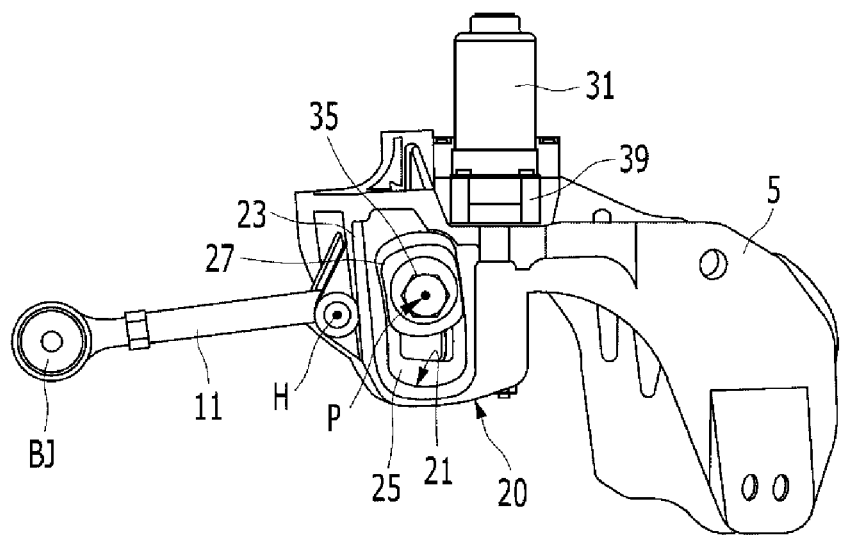
FIG. 2 is a side perspective view of an assist link and a node-changeable unit that are applied to the active geometry control suspension system of FIG. 1.
Figure 3:
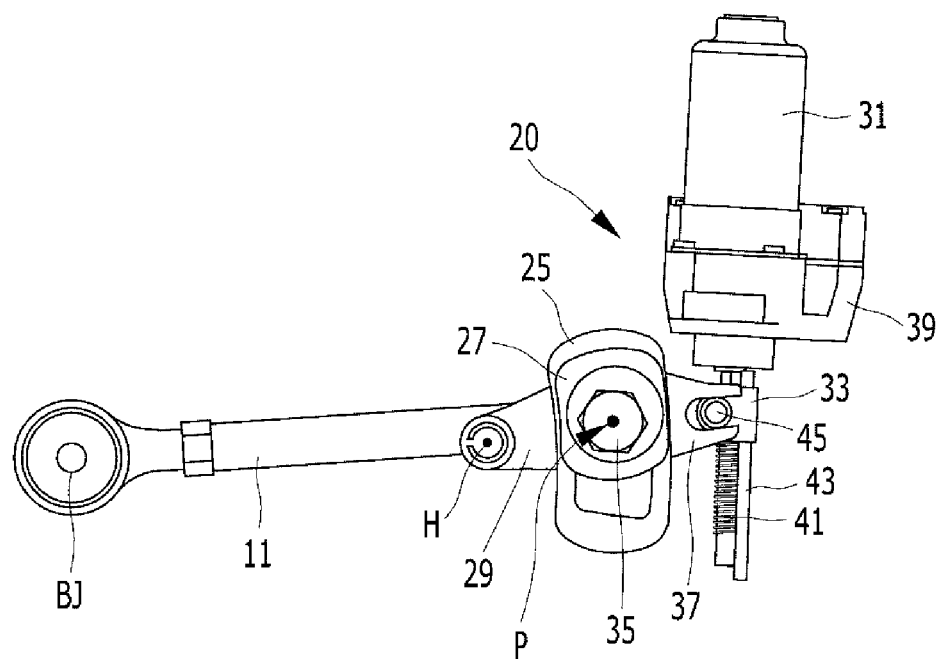
FIG. 3 is internal configuration view of the assist link and the node-changeable unit that are applied to the active geometry control suspension system of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention of the present invention will be described with reference to the accompanying drawings.

However, the drawings and description are to be regarded as illustrative in nature and not restrictive. Like reference numerals designate like elements throughout the specification.

Figure 4:
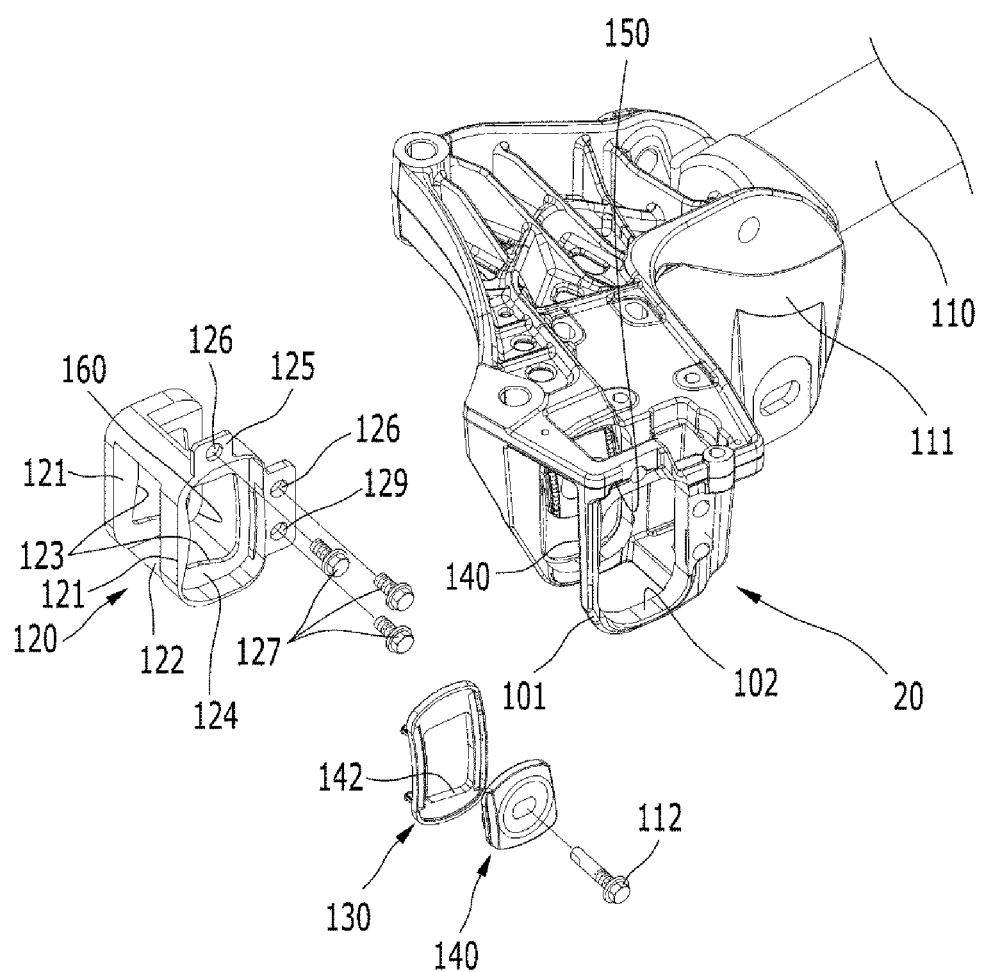
FIG. 4 is an exploded perspective view showing a portion extracted from an active geometry control suspension system according to an exemplary embodiment of the present invention.
Figure 5:
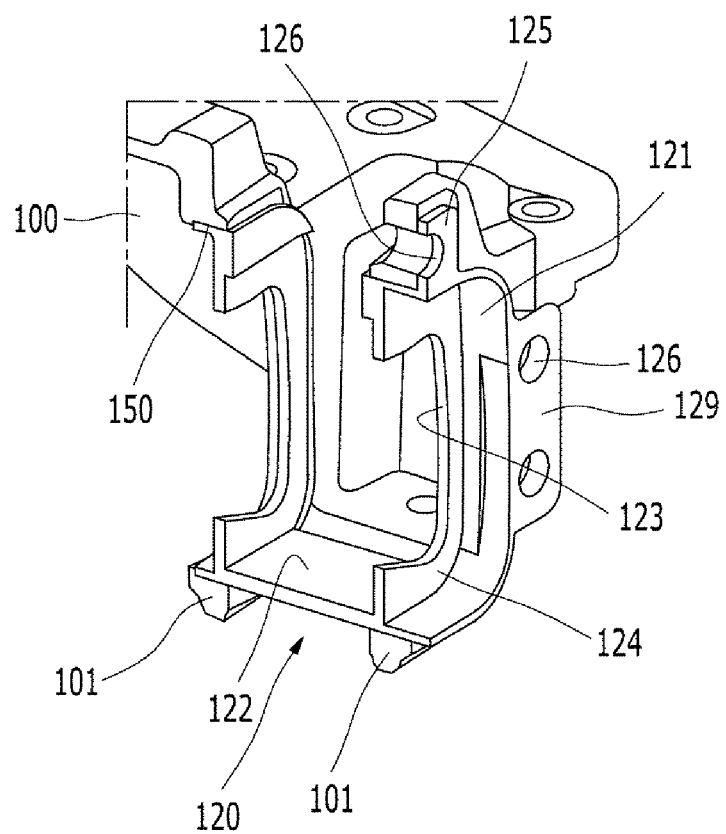
FIG. 5 is a cut perspective view of a kit-coupling part for a track-variable kit that is applied to the active geometry control suspension system according to an exemplary embodiment of the present invention.
Figure 6:
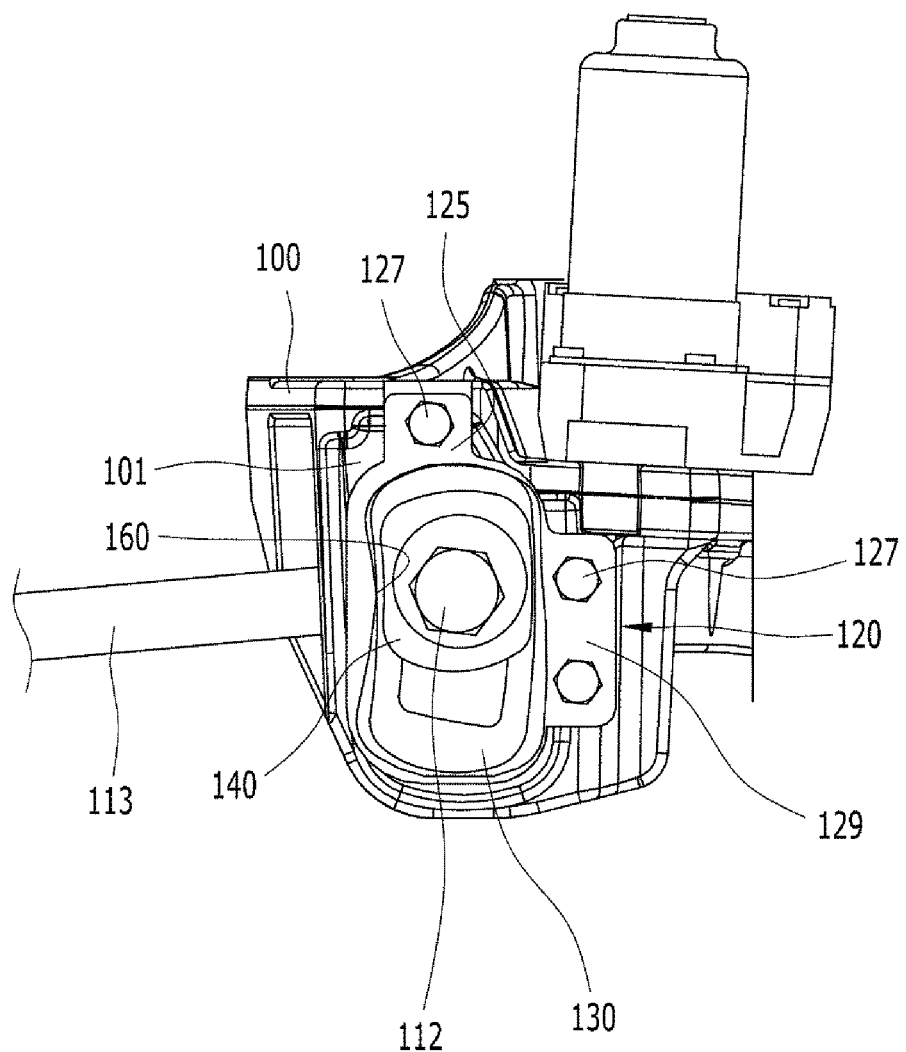
FIG. 6 is a side perspective view of an assist link and a node-changeable unit that are applied to the active geometry control suspension system according to an exemplary embodiment of the present invention.

FIG. 4 is an exploded perspective view showing a portion extracted from an active geometry control suspension system according to an exemplary embodiment of the present invention, FIG. 5 is a cut perspective view of a kit-coupling part for a track-variable kit that is applied to the active geometry control suspension system according to an exemplary embodiment of the present invention, and FIG. 6 is a side perspective view of an assist link and a node-changeable unit that are applied to the active geometry control suspension system according to an exemplary embodiment of the present invention.

Referring to FIGS. 4 and 5, a housing 100, where a node-changeable unit 20 of an active geometry control suspension system according to an exemplary embodiment of the present invention is disposed, is formed at a portion of subframes 111 disposed at both sides of a rear wheel-sided cross member 110.

A pair of brackets 101 protruding toward the wheel at a predetermined distance in the length direction of the vehicle body is formed at the housing 100 and a rail-mounting hole 102 is formed at each of the brackets 101.

A track-variable kit 120 is detachably disposed in the rail-mounting holes 102.

The track-variable kit 102 has vertical members 121 standing at both sides and a horizontal member 122 connecting the lower ends of the vertical member 122 in one unit.

The vertical members 121 correspond to the bracket 101 and have a through-hole 123 at the center portion through which a cam bolt 112 can slide up/down.

Further, rail seats 124 where cam-operating rails 130 are seated are formed at both sides of the vertical members 121, protrusions 125 are formed above one vertical member 121 and toward the vehicle body, and bolt holes 126 are formed through the protrusions 125.

Accordingly, with the track-variable kit 120 inserted in between the brackets 101, fixing bolts 127 are fixed to the bracket 101 through the bolt holes 126.

One bolt hole 126 is formed at the upper protrusion 125 and two bolt holes 126 are formed at the vehicle-sided protrusion 129, thereby achieving three-point fixing.

The cam-operating rails 130 disposed to be slidable up/down on the rail seats 124 are individually manufactured in precision-manufactured products This is because if the cam-operating rails 130 are integrally formed with the track-variable kit 120, it is necessary to precisely machine the track-variable kit 120 every time the tracks change, thereby increasing the manufacturing cost.

Further, the cam 140 is disposed to be slidable up/down on the outer sides of the cam-operating rails 130 and fastened to the vehicle body-sided connecting portion of the assist link 113 of FIG. 6 by the bolts 112.

In an exemplary embodiment of the present invention, a receiving opening 140 is formed between the brackets 101 to receive the horizontal member 122 and one of the vertical members 121 therethrough.

The brackets 101 may include a mounting groove 150 formed along an inner circumference of the rail-mounting hole 102.

The brackets 101 may be seated on the mounting groove 150.

In another aspect of the present invention, an guide hole 142 is formed to the cam-operating rails 130 and the cam 140 slidably covers the guide hole 142.

The rail seat may include a protrusion 160 extending towards the subframe 111 to prevent the cam 140 from being released from the cam-operating rail 130 by vibration applied thereto.

The node-changeable unit 20 is formed by the configuration, as shown in FIG. 6.

The configurations of the cam-operating rails 130, the cam 140, and the like and the operation of the node-changeable unit 20 are the same as those of the related art, and the detailed description is not provided.

As described above, as the node-changeable unit 20 is configured by individually manufacturing the track-variable kit 120, when it is necessary to change the track in tuning for improving toe change performance of a vehicle, it is possible to reduce the manufacturing cost only by manufacturing and applying a new track-variable kit 120.

Further, even though the operation track showing the optimum performance for the types of vehicles changes, it has only to keep using the housing 100 and separately manufacture a new track-variable kit 120, therefore, it is possible to reduce the development cost and the cost of products manufactured by mass production.

In addition, when the system is actually applied to a vehicle, it is possible to reduce A/S cost by replacing only the track-variable kit 120 even if the parts are replaced in A/S, and it is possible to improve satisfaction of consumers.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active geometric control suspension system including an upper arm connected to a side above and between a rear wheel-sided knuckle and a subframe, and an assist link connected to the other side above and between the knuckle and the subframe, together with a node-changeable unit,
    wherein the node-changeable unit includes:
    a housing formed at a portion of the subframe;
    a track-variable kit detachably coupled to brackets of the housing;
    cam-operating rails fixed to a side of the track-variable kit;
    a cam disposed on the cam-operating rails of the track-variable kit to be slidable up/down along the cam-operating rails; and
    a cam bolt connecting the cam with a vehicle body-sided connecting portion of the assist link.

2. The system of claim 1, wherein the track-variable kit has:
    vertical members standing at both sides, with the vehicle body-sided connecting portion of the assist link therebetween, and having a through-hole at the center thereof, wherein the vertical members are detachably fixed to the brackets of the housing; and
    a horizontal member connecting the vertical members.

3. The system of claim 2, wherein:
    bolt holes are formed at first and second protrusions formed upward from one of the vertical members and toward a vehicle body and the track-variable kit is fastened to the brackets of the housing by bolts.

4. The system of claim 2, wherein a receiving opening is formed between the brackets to receive the horizontal member and one of the vertical members therethrough.

5. The system of claim 2, wherein the vertical members include a rail seat recessed at a lateral side thereof and the through-hole is formed in the rail seat.

6. The system of claim 5, wherein the rail seat includes a protrusion extending towards the subframe.

7. The system of claim 1, wherein an guide hole is formed to the cam-operating rails and the cam slidably covers the guide hole.

8. The system of claim 1, wherein the brackets includes a mounting groove formed along an inner circumference of the rail-mounting hole.

9. The system of claim 8, wherein each of the vertical members of the track-variable kit is coupled to the mounting groove.

* * * * *